(12) United States Patent
Hara

(10) Patent No.: US 10,870,206 B2
(45) Date of Patent: Dec. 22, 2020

(54) WORKPIECE GRIPPING DEVICE

(71) Applicant: SMC CORPORATION, Chiyoda-ku (JP)

(72) Inventor: Koji Hara, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 310 days.

(21) Appl. No.: 15/973,897

(22) Filed: May 8, 2018

(65) Prior Publication Data

US 2018/0333864 A1    Nov. 22, 2018

(30) Foreign Application Priority Data

May 18, 2017    (JP) ................................. 2017-099096

(51) Int. Cl.
*B25J 15/02*    (2006.01)
*B25J 15/00*    (2006.01)

(52) U.S. Cl.
CPC ....... *B25J 15/0253* (2013.01); *B25J 15/0052* (2013.01); *B25J 15/024* (2013.01); *B25J 15/0293* (2013.01); *Y10S 901/39* (2013.01)

(58) Field of Classification Search
CPC ... B25J 15/00; B25J 15/02; B25J 15/04; B25J 15/08; B25J 15/024; B25J 15/0253; B25J 15/0293; B25J 15/0052; B25J 15/0273; Y10S 901/39

USPC .......................... 269/257, 269, 268, 258, 234
See application file for complete search history.

(56) References Cited

U.S. PATENT DOCUMENTS

| | | | | |
|---|---|---|---|---|
| 6,607,227 B1* | 8/2003 | Morton | ................... | H01R 43/20 |
| | | | | 269/268 |
| 9,498,887 B1* | 11/2016 | Zevenbergen | ....... | B25J 15/0616 |
| 2015/0251321 A1* | 9/2015 | Ishikawa | ................ | B25J 15/103 |
| | | | | 294/183 |

FOREIGN PATENT DOCUMENTS

JP    2013-000857    1/2013

\* cited by examiner

*Primary Examiner* — Tyrone V Hall, Jr.
*Assistant Examiner* — Khawaja H Samiullah
(74) *Attorney, Agent, or Firm* — Oblon, McClelland, Maier & Neustadt, L.L.P.

(57) ABSTRACT

A workpiece gripping device includes a base body and a pair of finger units configured to grip a workpiece. A first finger unit of the pair of finger units includes a scoop member configured to reciprocate in the direction of the arrow Z relative to the base body and rotate on a plane perpendicular to the direction of the arrow Z. A second finger unit of the pair of finger units includes a pressing member configured to reciprocate in the direction of the arrow X and rotate on a plane perpendicular to the direction of the arrow Z.

6 Claims, 9 Drawing Sheets

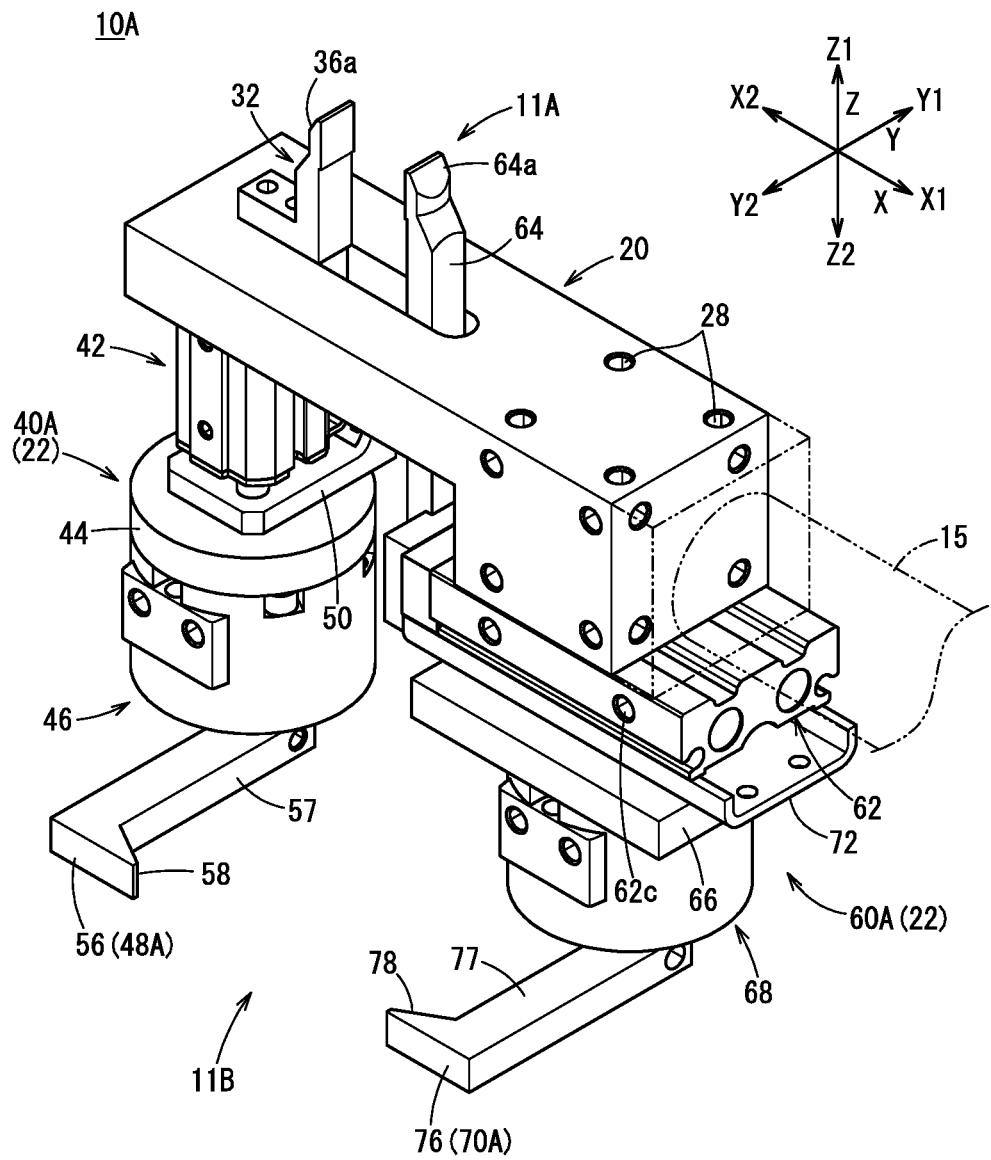

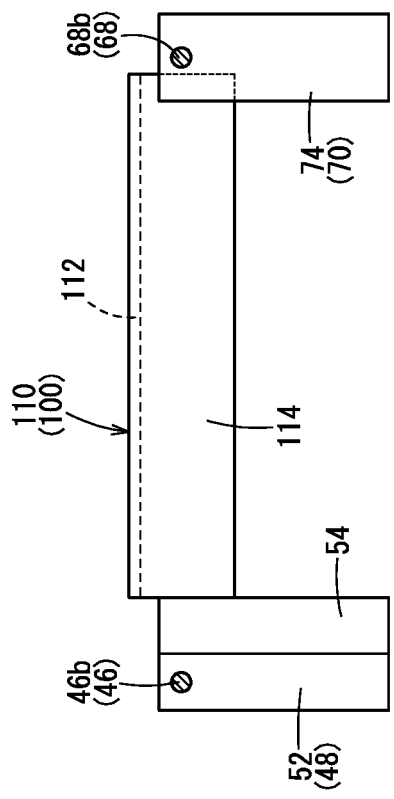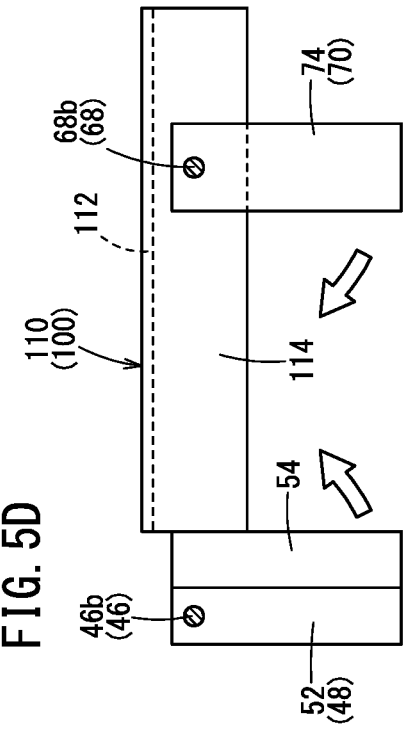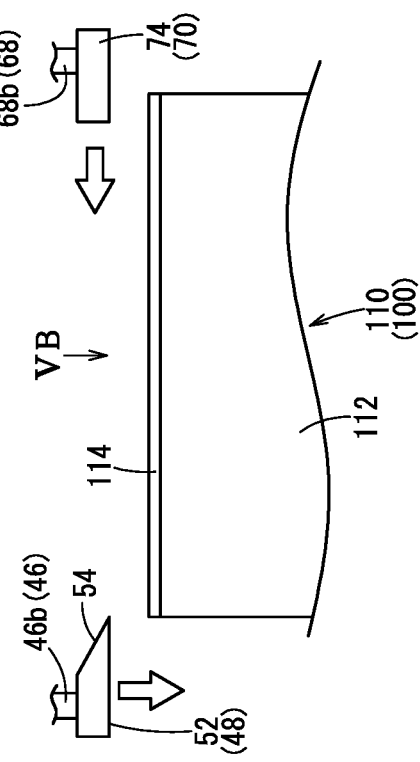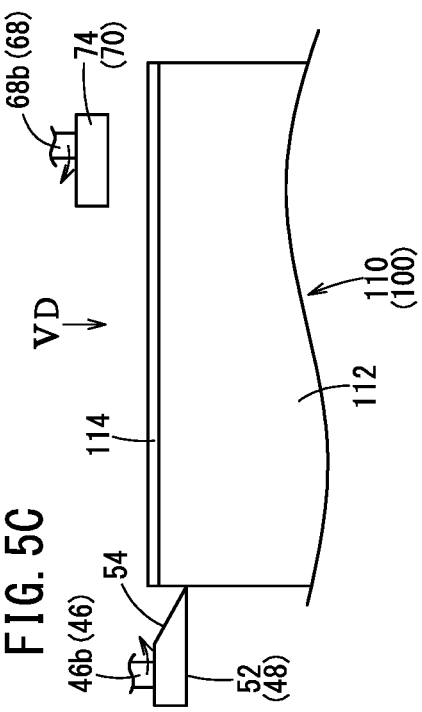

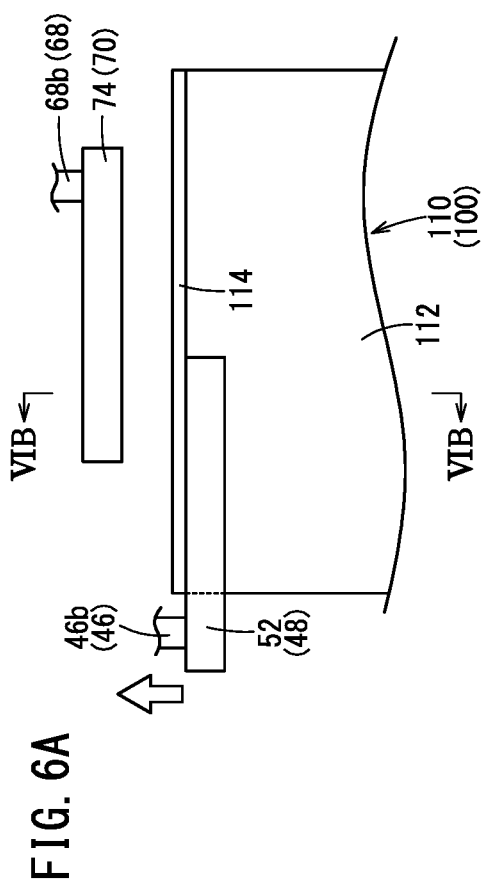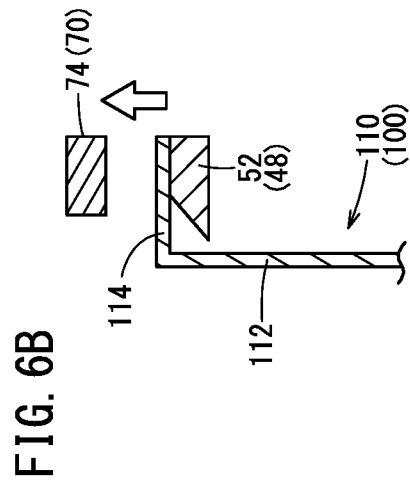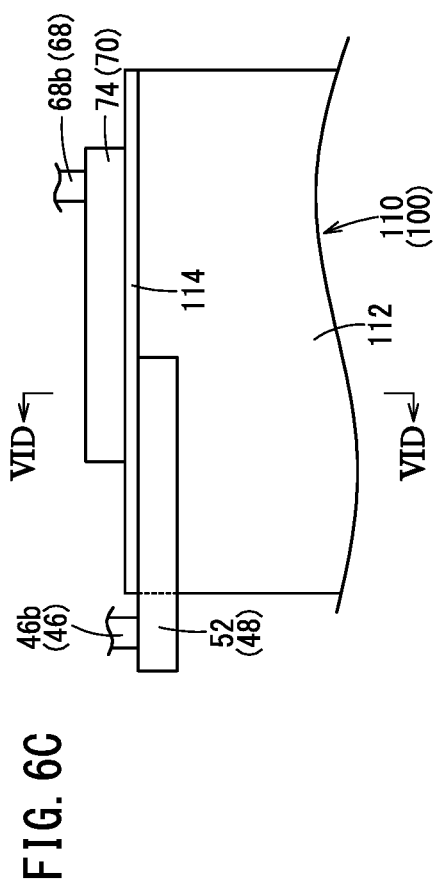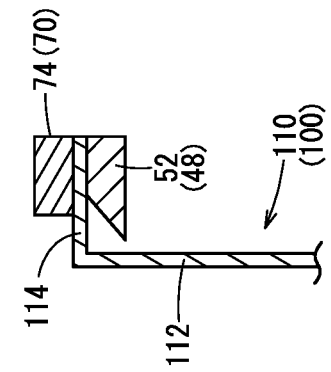

WORKPIECE GRIPPING DEVICE

CROSS-REFERENCE TO RELATED APPLICATION

This application is based upon and claims the benefit of priority from Japanese Patent Application No. 2017-099096 filed on May 18, 2017, the contents of which are incorporated herein by reference.

BACKGROUND OF THE INVENTION

Field of the Invention

The present invention relates to a workpiece gripping device which is used in a state of being attached to a robot.

Description of the Related Art

In order to improve production efficiency, automation for causing a robot to perform operations in at least a portion of respective steps of a production line is being promoted. For example, a workpiece gripping device (a so-called robot hand) is attached to the robot in order to extract workpieces from a predetermined location and transport the workpieces to other locations (see, for example, Japanese Laid-Open Patent Publication No. 2013-000857).

SUMMARY OF THE INVENTION

Conventional workpiece gripping devices have not been able to grip workpieces of different shapes and which are made of plate-shaped members such as sheet metal parts. For example, the workpiece gripping device disclosed in Japanese Laid-Open Patent Publication No. 2013-000857 is configured in a manner so as to be capable of gripping workpieces of different sizes, however, it is not configured to be capable of gripping workpieces of different shapes.

The present invention has been devised taking into consideration the aforementioned problem, and has the object of providing a workpiece gripping device which is capable of gripping workpieces of different shapes.

In order to achieve the aforementioned object, the present invention is characterized by a workpiece gripping device including a base body and a gripping mechanism disposed on the base body and configured to grip a workpiece, wherein the gripping mechanism includes a first finger unit having a first retaining structure configured to reciprocate in a first axial direction relative to the base body and rotate on a plane perpendicular to the first axial direction, and a second finger unit having a second retaining structure configured to reciprocate in a second axial direction perpendicular to the first axial direction, and rotate on a plane perpendicular to the first axial direction.

In accordance with the above configuration, with the first retaining structure of the first finger unit and the second retaining structure of the second finger unit, the workpiece gripping device is capable of suitably gripping workpieces of different shapes. More specifically, the first retaining structure, which moves back and forth (i.e., reciprocates) in the first axial direction and rotates on a plane perpendicular to the first axial direction, and the second retaining structure, which reciprocates in the second axial direction perpendicular to the first axial direction and rotates on a plane perpendicular to the first axial direction, are capable of selecting, according to the shape of the workpiece, between operations such as sandwiching the workpiece along the first axial direction, or sandwiching the workpiece along the second axial direction. Consequently, the workpiece gripping device is capable of adopting various gripping modes, and thereby can significantly enhance versatility.

Further, the first axial direction may be a direction in which the first retaining structure is made to approach toward or separate away from the base body, and the second axial direction may be a direction in which the second retaining structure is made to approach toward or separate away from the first finger unit.

By changing the relative distance of the first retaining structure with respect to the base body, together with changing the relative distance of the second retaining structure with respect to the first finger unit, the workpiece retaining structure can easily perform both sandwiching and releasing of sandwiching of the workpiece by the first and second retaining structures.

Alternatively, the base body may include a fixed gripping body that projects in a direction perpendicular to the second axial direction, and the second finger unit may include a movable gripping body configured to, by moving along the second axial direction, grip the workpiece between the movable gripping body and the fixed gripping body.

By a simple operation of moving the movable gripping body of the second finger unit along the second axial direction, the workpiece gripping device is capable of sandwiching and gripping the workpiece between the fixed gripping body and the movable gripping body.

In addition to the configuration described above, the workpiece gripping device may be of a configuration in which the fixed gripping body projects from the base body in a direction opposite to a direction in which the first finger unit projects, and the movable gripping body penetrates from the second finger unit through an elongate hole disposed in the base body, and projects in a direction opposite to a direction in which the second finger unit projects.

In addition to gripping workpieces by the first and second finger units, by changing the orientation of the base body, the workpiece gripping device can easily be switched to a state of gripping workpieces by the fixed gripping body and the movable gripping body.

In this instance, as viewed in plan, the first and second retaining structures preferably are arranged in a manner so that directions of rotation from a standby position of waiting prior to retaining the workpiece toward a retaining position of retaining the workpiece are mutually opposite to each other.

By the workpiece gripping device rotating the first and second retaining structures in mutually opposite directions, at the respective standby positions thereof, the first and second retaining structures are placed in a state of extending in the same direction. Thus, it is possible to reduce the range of movement of the first and second retaining structures from the respective standby positions to the retaining positions. Consequently, even in the case that the available space is small, it is still possible to grip the workpiece satisfactorily.

In addition, at least one of the first and second retaining structures may have a tapered portion on a side in a direction from the standby position toward the retaining position.

By having the tapered portion on at least one of the first and second retaining structures, it is possible for the workpiece gripping device to enable the tapered portion to easily enter onto the lower side of the workpiece when the first and second retaining structures are rotated.

Furthermore, each of the first and second retaining structures may have a claw member projecting from a side in a direction from the standby position toward the retaining position.

By having the claw members, the workpiece gripping device can cause the first and second retaining structures to access the workpiece from the sides of the workpiece, and can sandwich a single workpiece by mutual operation of the claw members.

Further, the first finger unit preferably includes a longitudinal actuator connected to the base body and configured to move the first retaining structure along the first axial direction, and a first rotary actuator connected to the longitudinal actuator and configured to rotate the first retaining structure, and the second finger unit preferably includes a lateral actuator connected to the base body and configured to move the second retaining structure along the second axial direction, and a second rotary actuator connected to the lateral actuator and configured to rotate the second retaining structure.

The workpiece gripping device enables the first retaining structure and the second retaining structure to be operated independently and in cooperation with each other, by the longitudinal actuator, the first rotary actuator, the lateral actuator, and the second rotary actuator.

According to the present invention, the workpiece gripping device is capable of suitably gripping workpieces of different shapes, and in accordance therewith, a robot including the workpiece gripping device exhibits high versatility enabling various types of workpieces to be transported.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a perspective view showing a workpiece gripping device according to a modification;

FIG. 5A is a first side view showing an operation of the workpiece gripping device;

FIG. 5B is a view as seen from the perspective of the arrow VB in FIG. 5A;

FIG. 5C is a second side view showing an operation of the workpiece gripping device;

FIG. 5D is a view as seen from the perspective of the arrow VD in FIG. 5C;

FIG. 6A is a third side view showing an operation of the workpiece gripping device;

FIG. 6B is a cross-sectional view taken along line VIB-VIB of FIG. 6A;

FIG. 6C is a fourth side view showing an operation of the workpiece gripping device;

FIG. 6D is a cross-sectional view taken along line VID-VID of FIG. 6C;

DESCRIPTION OF THE PREFERRED EMBODIMENTS

Preferred embodiments of a workpiece gripping device according to the present invention will be presented and described in detail below with reference to the accompanying drawings.

Figure 1:
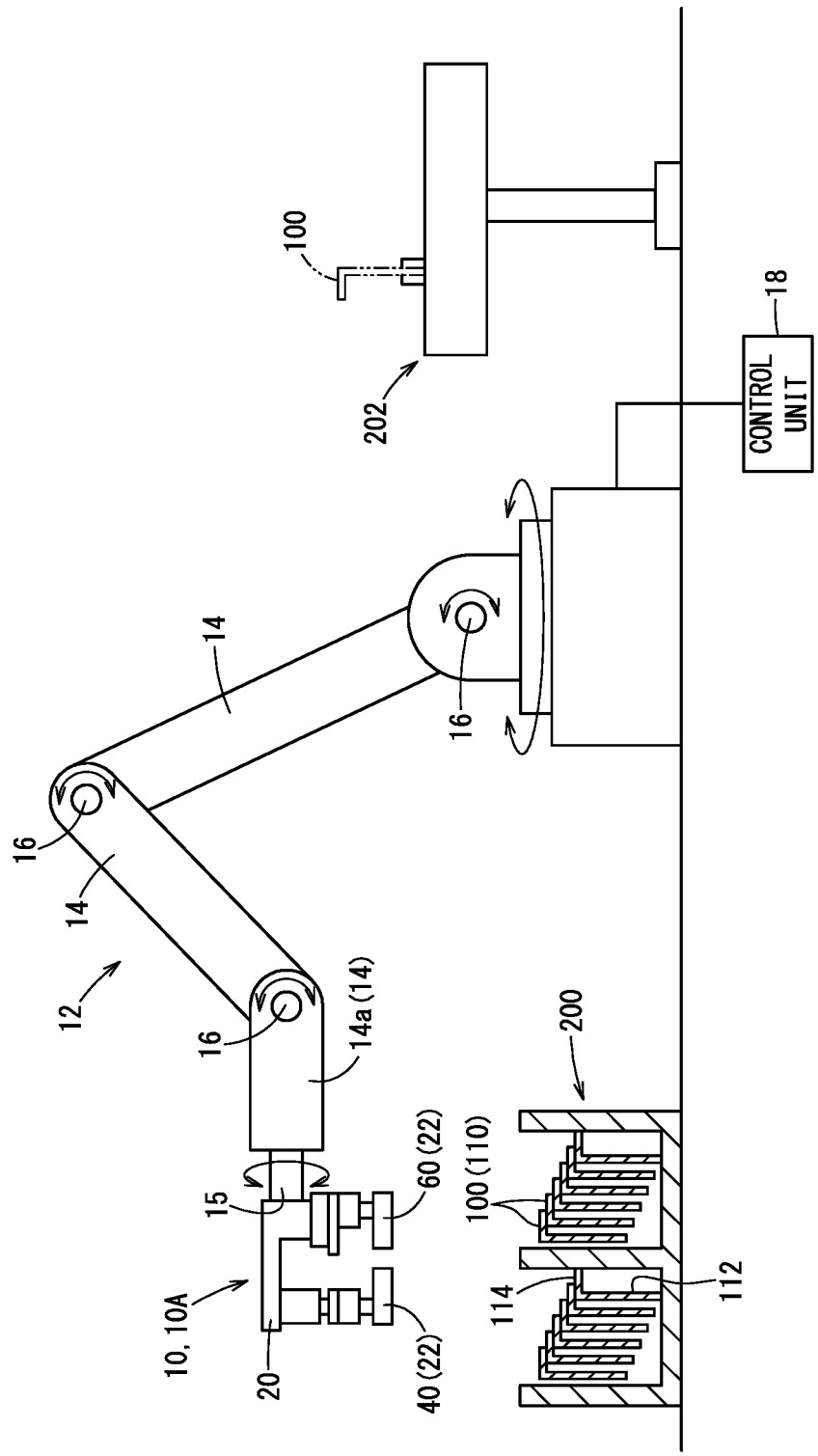
FIG. 1 is an explanatory view schematically showing a processing site, and a gripping robot to which a workpiece gripping device according to an embodiment of the present invention is applied.

As shown in FIG. 1, the workpiece gripping device 10 according to an embodiment of the present invention is used as an end effector of a gripping robot 12. The gripping robot 12 is installed in a factory, and transports workpieces 100 to another workpiece or a jig of a processing device that carries out a predetermined process (welding of workpieces or the like). Moreover, the object on which the workpiece gripping device 10 is mounted is not limited to the gripping robot 12, and may be applied to various devices with the aim of gripping workpieces.

For example, the gripping robot 12 is configured as a multi-jointed or articulated type of robot, and comprises a plurality of arms 14, a plurality of joints 16 that rotatably connect the arms 14 to each other, and a control unit 18 that controls operations of the respective joints 16. The control unit 18 of the gripping robot 12 moves the respective arms 14 and the respective joints 16 in order to move the workpiece gripping device 10 to a workpiece storage space 200 in which workpieces 100 are temporarily situated. In addition, the workpiece gripping device 10 grips (holds) a workpiece 100 under the control of the control unit 18. Furthermore, a gripped workpiece 100 is transported to a placement position 202 by operation of the respective arms 14 and the respective joints 16, and gripping of the workpiece 100 is released at the placement position 202 in order to arrange (set) the workpiece 100.

Figure 2:
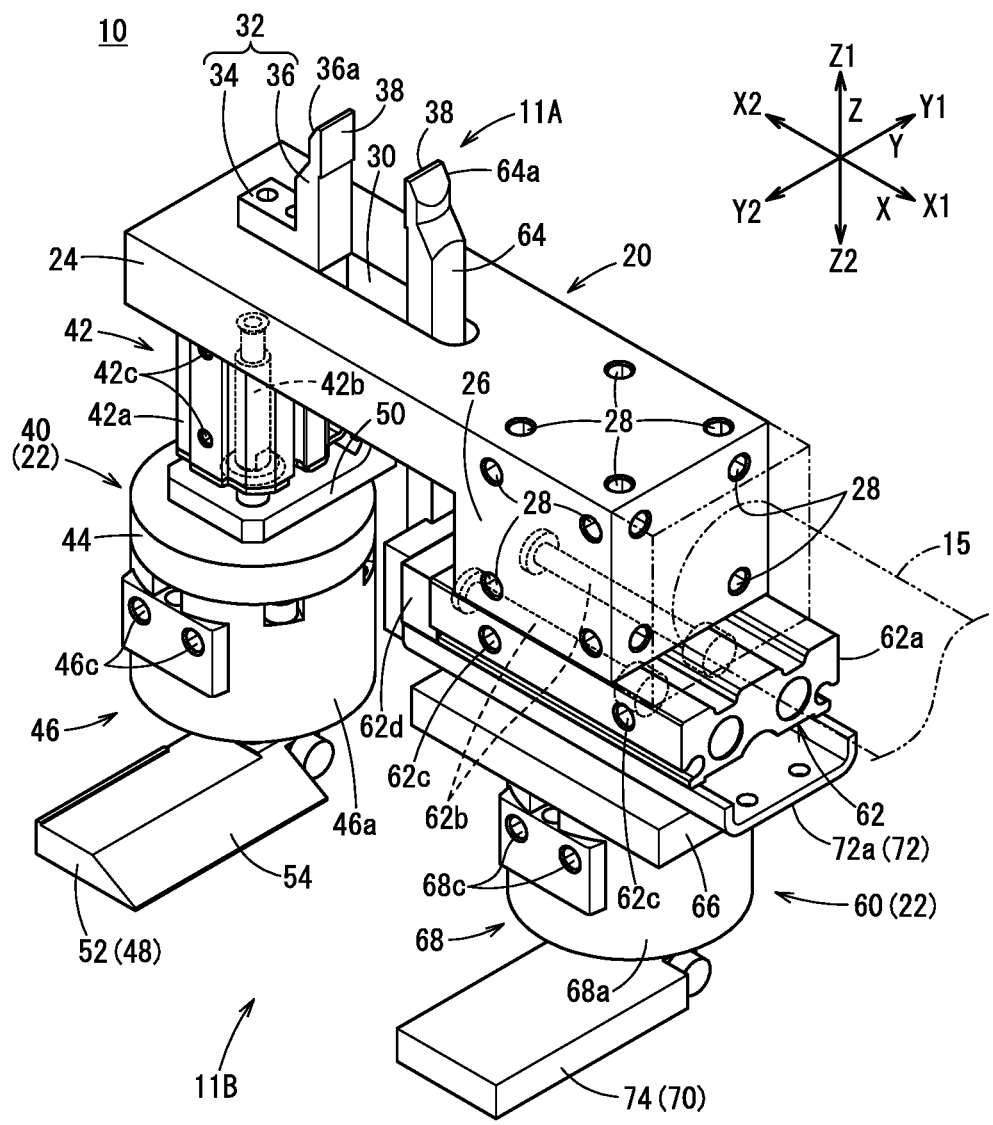
FIG. 2 is a perspective view showing the workpiece gripping device of FIG. 1.

In particular, as shown in FIG. 2, in order to grip a plurality of types of workpieces 100 having different shapes, the workpiece gripping device 10 according to the present embodiment is configured as a multi-handed type of robot that can implement different gripping modes. Below, details concerning the workpiece gripping device 10 will be specifically described.

Moreover, in the description given below, the directions of the device configuration will be described with reference to the directional indications shown in FIG. 2. More specifically, a lateral direction of the device (the roughly left and right directions in FIG. 2) is indicated by the arrow X, a widthwise direction of the device (the roughly rearward direction of the sheet and the roughly frontward direction of the sheet in FIG. 2) is indicated by the arrow Y, and a heightwise direction of the device (the upward and downward directions in FIG. 2) is indicated by the arrow Z. Further, the roughly rightward direction is indicated by the direction of the arrow X1, the roughly leftward direction is indicated by the direction of the arrow X2, the roughly rearward direction of the sheet is indicated by the direction of the arrow Y1, the roughly frontward direction of the sheet is indicated by the direction of the arrow Y2, the upward direction is indicated by the direction of the arrow Z1, and the downward direction is indicated by the direction of the arrow Z2. Moreover, the directional indications are provided in order to facilitate understanding of the description, and the workpiece gripping device 10 can be used in any arbitrary orientation under driving actions of the gripping robot 12.

A distal end arm 14a of the gripping robot 12 includes a mounted part 15 on which the workpiece gripping device 10 is mounted, and the mounted part 15 can be rotated relative to an outer shell of the distal end arm 14a by at least 180° or more (refer also to FIG. 1). Accordingly, together with rotation of the mounted part 15, the workpiece gripping device 10 can upwardly and downwardly reverse the directions of the arrow Z shown in FIG. 2 (refer also to FIG. 3).

Figure 3:
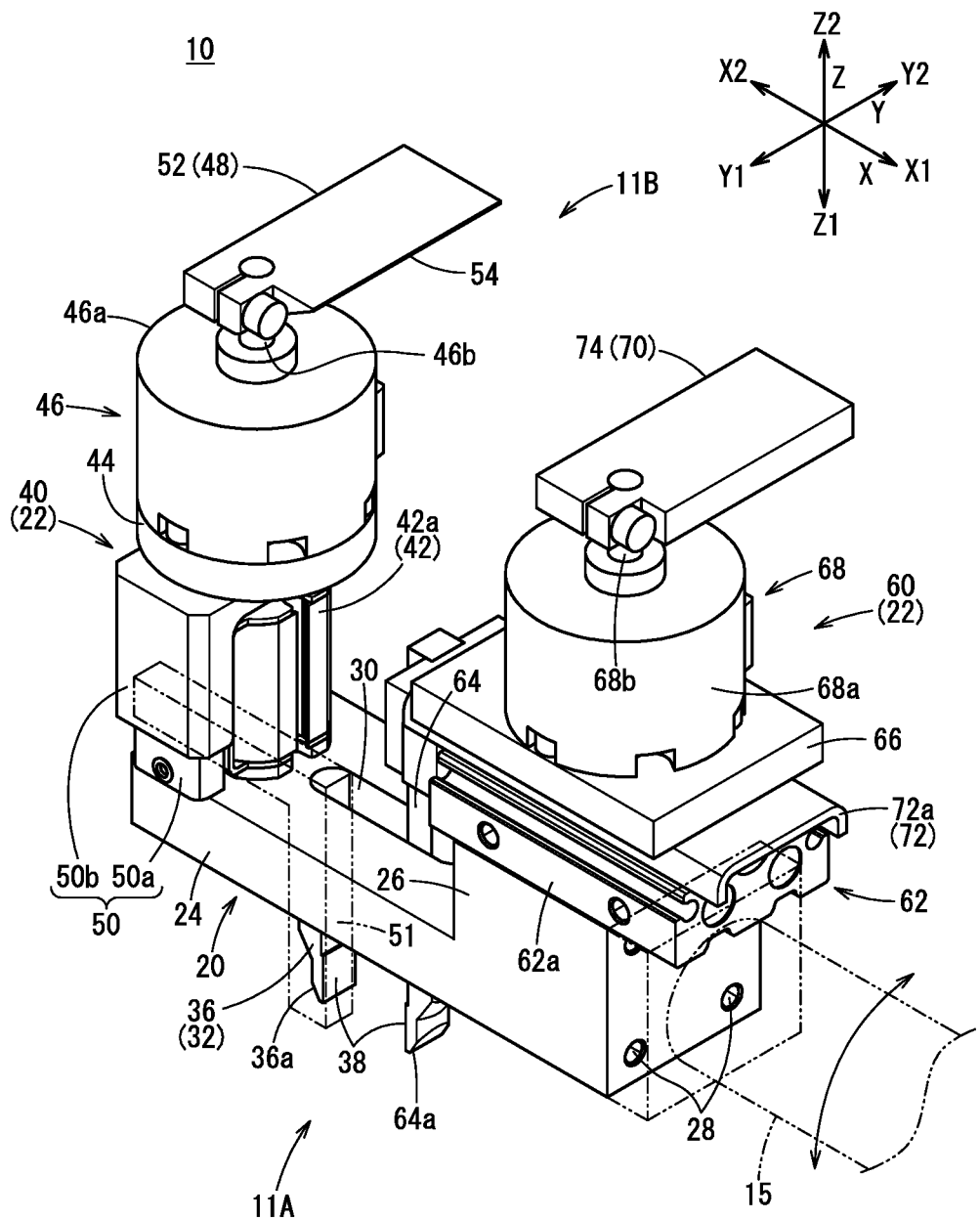
FIG. 3 is an explanatory drawing showing a state in which the workpiece gripping device in FIG. 2 is rotated by 180°.

As shown in FIGS. 2 and 3, the workpiece gripping device 10 includes a base body 20 connected to the mounted part 15, and a pair of finger units 22 provided on the base body 20 and which grip the workpiece 100. The pair of finger units 22 is constituted from a first finger unit 40 and a second finger unit 60, each of which perform different operations. Further, the operations of the pair of finger units 22 are controlled by the control unit 18 of the gripping robot 12. Moreover, the workpiece gripping device 10 may be provided with a control unit that exclusively controls the workpiece gripping device 10 separately from the control unit of the gripping robot 12.

The base body 20 is formed in a block shape and possesses a rigidity that enables the pair of finger units 22 to be operably retained. More specifically, a rectangular shaped first block 24, which extends in the direction of the arrow X and possesses a sufficient thickness in the direction of the arrow Z, and a rectangular shaped second block 26 on a side of the first block 24 in the direction of the arrow X1 and contiguous therewith in the direction of the arrow Z2 are constructed together integrally.

The first finger unit 40 is attached to a surface (lower surface) of the first block 24 in the direction of the arrow Z2, and the second finger unit 60 is attached to a surface of the second block 26 in the direction of the arrow Z2. As a result, the base body 20 supports the first finger unit 40 and the second finger unit 60 at positions which are separated from each other by a predetermined distance.

The length of the second block 26 in the direction of the arrow X is shorter than that of the first block 24. Therefore, the lower surface side of the base body 20 exhibits a stepped shape. The second block 26 together with the first block 24 forms a portion by which the base body 20 is attached to the mounted part 15, and functions as a spacer for suitably adjusting the height of the first finger unit 40 and the height of the second finger unit 60.

At an end part of the base body 20 in the direction of the arrow X1, a plurality (four as shown in FIG. 2) of mounting screw holes 28 are provided on each of an end surface in the direction of the arrow X1, a side surface in the direction of the arrow Y2, and a side surface in the direction of the arrow Z1. Consequently, the base body 20 can be screwed and fixed to the mounted part 15 in various postures. For example, by connecting the end surface of the base body 20 in the direction of the arrow X1 and the mounted part 15, the base body 20 is rotated about an axis of extension of the mounted part 15 in the direction of the arrow X, and the pair of finger units 22 can be reversed in position by 180°. The means by which the base body 20 and the mounted part 15 are fixed to each other is not limited to screw fixing, and various other methods such as welding or the like may be employed.

Further, an elongate hole 30 that extends in the longitudinal direction (the direction of the arrow X) is disposed at a central portion of the base body 20 in the lateral direction as viewed in plan (in the direction of the arrow Z2). The elongate hole 30 is formed to penetrate in the direction of the arrow Z in the first block 24 nearer to the direction of the arrow X2. A movable gripping body 64 of the second finger unit 60, to be described later, is disposed in the elongate hole 30.

Further, a fixed gripping body 32, which is capable of sandwiching (clamping) the workpiece 100 between itself and the second finger unit 60, is provided on a surface (upper surface) of the base body 20 in the direction of the arrow Z1. The fixed gripping body 32 is connected to a central portion of the base body 20 in the lateral direction, and is contiguous with a side of the elongate hole 30 in the direction of the arrow X2, to thereby close a portion of the elongate hole 30.

The fixed gripping body 32 is formed in an L-shape in side view (as viewed in the direction of the arrow Y2). More specifically, the fixed gripping body 32 includes a fixed portion 34 which extends in the direction of the arrow X with the same width as the width of the elongate hole 30, and an extending portion 36 which is bent at a right angle at one end of the fixed portion 34, and extends in the direction of the arrow Z1. The fixed portion 34 is firmly fixed to the base body 20 by an appropriate fixing means such as screw fixing, adhesion, welding, or the like.

The extending portion 36 of the fixed gripping body 32 and the second finger unit 60 constitute a first gripping mechanism 11A which directly grips a workpiece 100 therebetween. An extending end part 36a of the extending portion 36 exhibits a wedge shape, in which a side surface on a side in the direction of the arrow X2 is inclined toward a projecting direction thereof in the direction of the arrow X1, and a side surface on a side in the direction of the arrow X1 extends in a flat shape. A rubber piece 38 having an increased elastic force and frictional resistance is provided on the side surface of the extending end part 36a on the side in the direction of the arrow X1.

The pair of finger units 22, which are provided on the opposite side of the first gripping mechanism 11A, constitute a second gripping mechanism 11B for gripping the workpieces 100 through mutual cooperation of the first finger unit 40 and the second finger unit 60.

The first finger unit 40 includes a longitudinal actuator 42, a spacer 44, a first rotary actuator 46, and a first retaining structure 48. The longitudinal actuator 42 and the first rotary actuator 46 constitute drive mechanisms for enabling movement of the first retaining structure 48 relative to the base body 20.

An upper part of the longitudinal actuator 42 is connected and fixed to the base body 20, and moves the spacer 44, the first rotary actuator 46, and the first retaining structure 48, which are connected to the lower part thereof, in the direction of the arrow Z (first axial direction). As this type of drive mechanism, there can be applied, for example, an air cylinder having a fixed cylinder 42a, and a movable bar 42b that moves relatively with respect to the fixed cylinder 42a on the basis of supply and discharge of air (compressed air).

More specifically, part of the movable bar 42b is accommodated inside the fixed cylinder 42a, and a flange (not shown) that divides the internal space (not shown) inside the fixed cylinder 42a is provided on the movable bar 42b.

Further, two ports 42*c*, which are capable of allowing air to flow into and flow out of each of the divided internal spaces, are provided on the fixed cylinder 42*a*. The ports 42*c* are connected to a non-illustrated air source. By supplying or discharging air under the control of the control unit 18, the internal pressure of each of the internal spaces is adjusted. Consequently, the flange is moved to an appropriate position, and the position of the movable bar 42*b* is adjusted. Moreover, the longitudinal actuator 42 is not limited to the above-described configuration, and other configurations, for example, a hydraulic cylinder, a ball screw mechanism, or the like may be applied.

Further, a first guide mechanism 50, which is disposed in the vicinity of the fixed cylinder 42*a* and guides sliding of the movable bar 42*b*, is provided on the longitudinal actuator 42. The first guide mechanism 50 is constituted from a guide rail 50*a* connected to the fixed cylinder 42*a*, and an L-shaped slider 50*b* connected to the movable bar 42*b* (see FIG. 3). The slider 50*b* includes a first portion extending in the direction of the arrow Z, and a second portion, which is bent perpendicularly at an end part in the direction of the arrow Z2, with the movable bar 42*b* being connected to one surface, and the spacer 44 being connected to another surface. The first portion of the slider 50*b* is guided along the guide rail 50*a* accompanying displacement of the movable bar 42*b*, and thereby stably displaces the spacer 44 in the direction of the arrow Z.

The spacer 44 of the first finger unit 40 is formed in a disc shape having a predetermined plate thickness, and adjusts the position of the first retaining structure 48 in relation to the second finger unit 60 in the direction of the arrow Z. On a lower surface (a surface in the direction of the arrow Z2) of the spacer 44, the first rotary actuator 46 is fixed by a fixing means such as screws or the like.

The first rotary actuator 46 rotates and moves the first retaining structure 48 about the axis in the direction of the arrow Z. As this type of drive mechanism, there can be applied, for example, a rotary actuator having a cylindrical body 46*a* connected to the spacer 44, and a rotary shaft 46*b* (see FIG. 3), which rotates relatively with respect to the cylindrical body 46*a* on the basis of supply and discharge of air.

As an example, in the first rotary actuator 46, a vane (not shown) is connected to the rotary shaft 46*b*, and a fixed wall (not shown) for determining an angular range of the vane is provided inside the cylindrical body 46*a*. Further, inside the cylindrical body 46*a*, pressure chambers are formed respectively on both sides of the vane, and non-illustrated air sources are connected to two ports 46*c* that communicate with the respective pressure chambers in the cylindrical body 46*a*. The air sources supply and discharge air under the control of the control unit 18, whereby the vane is rotated and the motion thereof is transmitted to the rotary shaft 46*b*. Moreover, the first rotary actuator 46 is not limited to the above-described configuration, and other configurations may be applied thereto, such as a motor mechanism or the like.

The first retaining structure 48 is fixed to the rotary shaft 46*b* that protrudes from the cylindrical body 46*a* in the direction of the arrow Z2. As the rotary shaft 46*b* rotates, the first retaining structure 48 rotates centrally about the rotary shaft 46*b* on a plane perpendicular to the direction of the arrow Z.

The first retaining structure 48 according to the present embodiment is constituted by a plate-shaped scoop member 52 that sandwiches the workpiece 100 from above and below in cooperation with the second finger unit 60. One end portion of the scoop member 52 in the longitudinal direction is connected to the rotary shaft 46*b*, and the scoop member 52 extends from the one end portion by a predetermined length in a direction perpendicular to the axial direction (the direction of the arrow Z) of the rotary shaft 46*b*. Based on the operational state of the rotary shaft 46*b*, the scoop member 52 is movable to a retaining position which is arranged along the direction of the arrow X1, and to a standby position which is arranged along the direction of the arrow Y2.

The scoop member 52 is formed in a substantially rectangular parallelepiped shape having a predetermined thickness in the direction of the arrow Z. One side part of the scoop member 52 in a direction of rotation from the standby position toward the gripping position is a tapered portion 54, the upper surface (the surface in the direction of the arrow Z1) of which is inclined downward. Moreover, the lower surface (the surface in the direction of the arrow Z2) of the tapered portion 54 is formed in a flat shape. Stated otherwise, as viewed in cross-section, the tapered portion 54 is formed in a right triangular shape, in which the thickness thereof gradually decreases toward the outer side in the widthwise direction.

By having such a tapered portion 54, when the scoop member 52 is rotated from the standby position to the retaining position, a lower acute angular portion thereof first enters onto the lower side of the workpiece 100. Owing thereto, the scoop member 52 can easily enter onto the lower side of the workpiece 100 along the inclination of the tapered portion 54, and the workpiece 100 can be scooped up and guided to the upper surface (flat surface) of the scoop member 52.

Moreover, the first retaining structure 48 is not limited to being the scoop member 52 shown in FIG. 2, and various alternative configurations can be applied thereto. FIG. 4 is a perspective view of a workpiece gripping device 10A according to a modification. A first finger unit 40A (first retaining structure 48A) of the workpiece gripping device 10A is constituted by a first hook portion 56 for accessing the workpiece 100 from a side of the workpiece 100, or hooking a predetermined location of the workpiece 100, in cooperation with a second finger unit 60A.

The first hook portion 56 includes an extending plate body 57 having one end in the longitudinal direction thereof connected to the rotary shaft 46*b* and which extends by a predetermined length in a direction perpendicular to the axial direction of the rotary shaft 46*b*, and a claw member 58 connected to the other end portion of the extending plate body 57.

The claw member 58 is formed to project from one side part (a side part in the direction of rotation from the standby position to the retaining position of the first hook portion 56) of the extending plate body 57. As viewed in plan, the claw member 58 lies flush with an end surface of the extending plate body 57, and is formed in a right triangular shape, in which the width thereof becomes narrower toward the direction in which the claw member 58 projects.

Returning to FIGS. 2 and 3, the second finger unit 60 of the workpiece gripping device 10 is a portion that constitutes the first gripping mechanism 11A together with the fixed gripping body 32, and constitutes the second gripping mechanism 11B together with the first finger unit 40. More specifically, the second finger unit 60 includes a lateral actuator 62, a movable gripping body 64, a spacer 66, a second rotary actuator 68, and a second retaining structure 70. Unlike the first finger unit 40, the second finger unit 60 displaces the second retaining structure 70 in the direction of the arrow X (second axial direction) without displacing the second retaining structure 70 in the direction of the arrow Z.

An upper part of the lateral actuator 62 is connected and fixed to the base body 20, and the lateral actuator 62 reciprocates the movable gripping body 64, the spacer 66, the second rotary actuator 68, and the second retaining structure 70 in the direction of the arrow X. As this type of drive mechanism, in the same manner as the longitudinal actuator 42, there can be applied an air cylinder having a fixed cylinder 62a, and movable bars 62b that move relatively with respect to the fixed cylinder 62a on the basis of supply and discharge of air.

In greater detail, the lateral actuator 62 comprises a pair of movable bars 62b that move with respect to a box-shaped fixed cylinder 62a, and the projecting end portions (end portions in the direction of the arrow X2) of the respective movable bars 62b are bridged by an attachment body 62d. Similar to the longitudinal actuator 42, the fixed cylinder 62a is equipped with internal spaces into which the interior of the fixed cylinder is divided by flanges (not shown) of the respective movable bars 62b, and two ports 62c which are capable of allowing air to flow into and flow out of each of the divided internal spaces. The respective ports 62c are connected respectively to a non-illustrated air source. By supplying or discharging air under the control of the control unit 18, the internal pressure of each of the internal spaces is adjusted, and the position of each of the movable bars 62b in the direction of the arrow X is adjusted.

A second guide mechanism 72 is provided on the lateral actuator 62 in order to guide sliding of the attachment body 62d, and is constituted by a guide rail (not shown) connected to the fixed cylinder 62a, and a U-shaped slider 72a connected to the attachment body 62d. The movable gripping body 64 is fixed to the attachment body 62d together with the slider 72a, and the lateral actuator 62 causes the slider 72a and the movable gripping body 64 to slide integrally in the direction of the arrow X.

The movable gripping body 64 extends linearly along the direction of the arrow Z1 from a root part thereof connected to the attachment body 62d, and protrudes to the opposite side of the base body 20 via the elongate hole 30 of the base body 20. An extending end part 64a of the movable gripping body 64 is set at the same height as the extending end part 36a of the fixed gripping body 32 that is fixed to the base body 20. The extending end part 64a of the movable gripping body 64 is formed symmetrically with the fixed gripping body 32, and is formed in a wedge shape, together with a rubber piece 38 being disposed on a surface thereof that faces toward the fixed gripping body 32.

Further, the spacer 66 is fixed to a lower surface of the slider 72a of the second guide mechanism 72. The spacer 66 of the second finger unit 60 is formed in a rectangular plate shape having a predetermined plate thickness, and adjusts the height (in the direction of the arrow Z) of the second retaining structure 70. On a lower surface (a surface in the direction of the arrow Z2) of the spacer 66, the second rotary actuator 68 is fixed by a fixing means such as screws or the like.

For the second rotary actuator 68, a structure can be adopted which is similar to that of the first rotary actuator 46 (i.e., a configuration having a cylindrical body 68a and a rotary shaft 68b). However, the direction of rotation of the rotary shaft 68b of the second rotary actuator 68 is set in a direction opposite to that of the first rotary actuator 46. Accordingly, the first retaining structure 48 and the second retaining structure 70 extend in the same direction (the direction of the arrow Y2 in FIG. 2) at their standby positions, and the extending ends thereof are placed in proximity to each other when rotated toward their retaining positions.

The second retaining structure 70 according to the present embodiment is configured in the form of a plate-shaped pressing member 74. The pressing member 74 is formed in a rectangular parallelepiped shape having an extension length, a width, and a plate thickness similar to those of the scoop member 52. Accompanying rotation of the rotary shaft 68b, the pressing member 74 is movable to a retaining position at which the pressing member is arranged along the direction of the arrow X2, and to a standby position at which the pressing member is arranged along the direction of the arrow Y2. The scoop member 52 and the pressing member 74 retain the workpiece 100 by sandwiching the workpiece 100 mutually therebetween.

In the workpiece gripping device 10A according to the modification shown in FIG. 4, the second finger unit 60A (the second retaining structure 70A) also has a second hook portion 76 which is symmetrical with the first hook portion 56 of the first retaining structure 48A. Stated otherwise, the second hook portion 76 includes an extending plate body 77, and a claw member 78, which is disposed contiguously with an extending end part of the extending plate body 77, and projects from a side part of the plate body 77 in the direction of rotation from the standby position to the retaining position of the second hook portion 76. The claw member 78 is formed in a right triangular shape having a width that becomes narrower toward the direction in which the claw member 78 projects.

Although omitted from illustration in the drawings, the workpiece gripping device 10 may have a configuration including both the scoop member 52 and the pressing member 74, together with the first and second hook portions 56, 76. For example, the workpiece gripping device 10 is configured such that the rotary shafts 46b, 68b of the first and second rotary actuators 46, 68 are rotatable by 180° or more. In addition, the first retaining structure 48 has a configuration in which the scoop member 52 and the first hook portion 56 project in opposite directions (positions shifted 180° out of phase) with the rotary shaft 46b serving as a base point, and the second retaining structure 70 has a configuration in which the pressing member 74 and the second hook portion 76 project in opposite directions with the rotary shaft 68b serving as a base point. Consequently, the workpiece gripping device 10 can be switched between a case in which the scoop member 52 and the pressing member 74 are used, and a case in which the first and second hook portions 56, 76 are used, in accordance with the shape of the workpiece 100.

The workpiece gripping devices 10, 10A according to the present embodiment are basically configured in the manner described above. Advantages and effects of the workpiece gripping devices 10, 10A will be described below.

As was discussed above, the workpiece gripping device 10 realizes various gripping modes corresponding to various shapes of the workpieces 100, by changing the posture of the device as a whole, as well as the actions or motions of the pair of finger units 22. Hereinafter, a case will be described in which, as shown in FIG. 1, a workpiece 110 having a planar main plate portion 112, and an edge portion 114 which is bent at one side of the main plate portion 112 is gripped. The workpieces 110, for example, are housed in an upstanding manner in a basket of the workpiece storage space 200, with the edge portions 114 thereof positioned upward, and the edge portions 114 overlapping.

In this case, the operator sets the control contents of the control unit 18 so that the edge portion 114 of the workpiece 110 is gripped by the pair of finger units 22 (the scoop member 52 and the pressing member 74 of the second gripping mechanism 11B) of the workpiece gripping device 10. At a time of processing the workpieces 110, the gripping robot 12 operates the plurality of arms 14 and the plurality of joints 16 on the basis of instructions from the control unit 18, and moves the workpiece gripping device 10 to the workpiece storage space 200. Consequently, as shown in FIGS. 5A and 5B, the workpiece gripping device 10 is disposed at a position separated by a predetermined distance above the workpiece 110 which is intended to be gripped. At this time, the scoop member 52 and the pressing member 74 are disposed in a standby position along the direction of the arrow Y2 (see also FIG. 2).

After positioning the workpiece gripping device 10 with respect to the workpiece 110 to be gripped, the control unit 18 operates the first and second finger units 40, 60 to thereby move the first and second retaining structures 48, 70. More specifically, the first finger unit 40 drives the longitudinal actuator 42, and moves the scoop member 52 in a downward direction (the direction of the arrow Z2). Consequently, the scoop member 52 is disposed at the same height position as the edge portion 114 of the workpiece 110. Further, the second finger unit 60 drives the lateral actuator 62, and moves the pressing member 74 in a lateral direction (the direction of the arrow X2). More specifically, the pressing member 74 is disposed at a position higher than the scoop member 52 and the edge portion 114 of the workpiece 110.

Next, as shown in FIGS. 5C and 5D, the first finger unit 40 drives the first rotary actuator 46 to thereby rotate the scoop member 52 in a counterclockwise direction, and move the scoop member 52 from the standby position to the retaining position. When rotated, the tapered portion 54 of the scoop member 52 enters onto the lower side of the edge portion 114 of the workpiece 110, and scoops up the edge portion 114 along the inclination thereof, while the scoop member 52 is slid inwardly on the lower side of the edge portion 114. At a lower part of the edge portion 114, the scoop member 52, which is arranged at the retaining position, is in a posture that is oriented along the direction (the direction of the arrow X1) in which the edge portion 114 extends (refer also to FIGS. 6A and 6B).

On the other hand, the second finger unit 60 drives the second rotary actuator 68 to thereby rotate the pressing member 74 in a clockwise direction, and move the pressing member 74 from the standby position to the retaining position. In the retaining position, above the edge portion 114, the pressing member 74 is in a posture oriented along the direction (the direction of the arrow X2) in which the edge portion 114 extends. In addition, by the pressing member 74 being positioned above the edge portion 114, a change in attitude of the workpiece 110 when the scoop member 52 enters onto the lower side of the edge portion 114 of the workpiece 110 is suppressed. Moreover, rotation of the pressing member 74 need not necessarily occur simultaneously with rotation of the scoop member 52. For example, the scoop member 52 may be rotated after having first placed the pressing member 74 at the retaining position.

When the scoop member 52 is disposed on the lower side of the edge portion 114, the workpiece gripping device 10 drives the longitudinal actuator 42 and moves the scoop member 52 in an upward direction (the direction of the arrow Z1), whereby the edge portion 114 of the workpiece 110 is lifted. In this instance, in the case that the pressing member 74 moves in the direction of the arrow X2, and the scoop member 52 and the pressing member 74 are both arranged together at their retaining positions, the scoop member 52 and the pressing member 74 partially overlap one another as viewed in plan. Therefore, when the scoop member 52 is moved upward, the scoop member 52 immediately reaches the vicinity of the pressing member 74 that resides thereabove, to thereby sandwich the edge portion 114 of the workpiece 110 between the scoop member 52 and the pressing member 74.

Accordingly, as shown in FIGS. 6C and 6D, the workpiece gripping device 10 can grip the edge portion 114 of the workpiece 110 from above and below. In addition, in the gripped state, the gripping robot 12 extracts the workpiece 110 by pulling the workpiece gripping device 10 upward, and transports the workpiece 110 to the placement position 202 (jig) (see also FIG. 1). At this time, since the edge portion 114 is sandwiched from above and below, the workpiece gripping device 10 is capable of significantly preventing the workpiece 110 from being dropped or falling down.

Figure 7A:
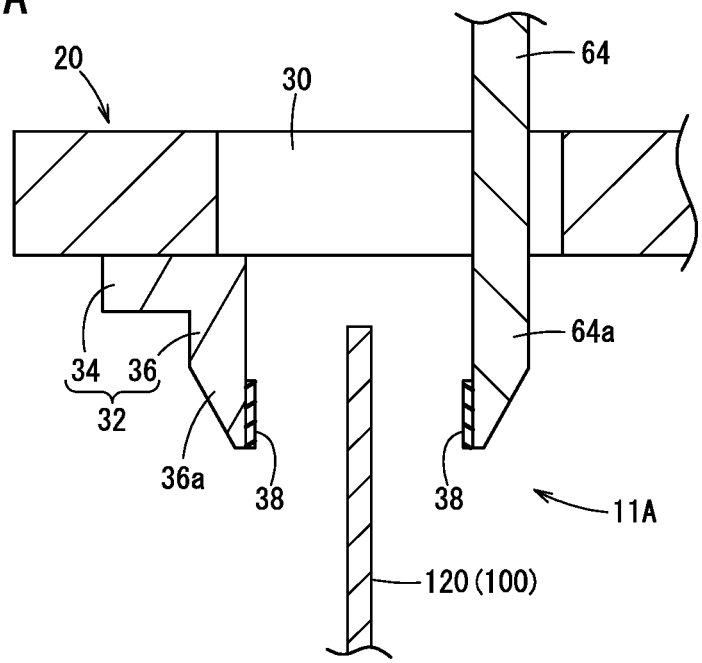
FIG. 7A is a first side cross-sectional view showing gripping by a first gripping mechanism of the workpiece gripping device.
Figure 7B:
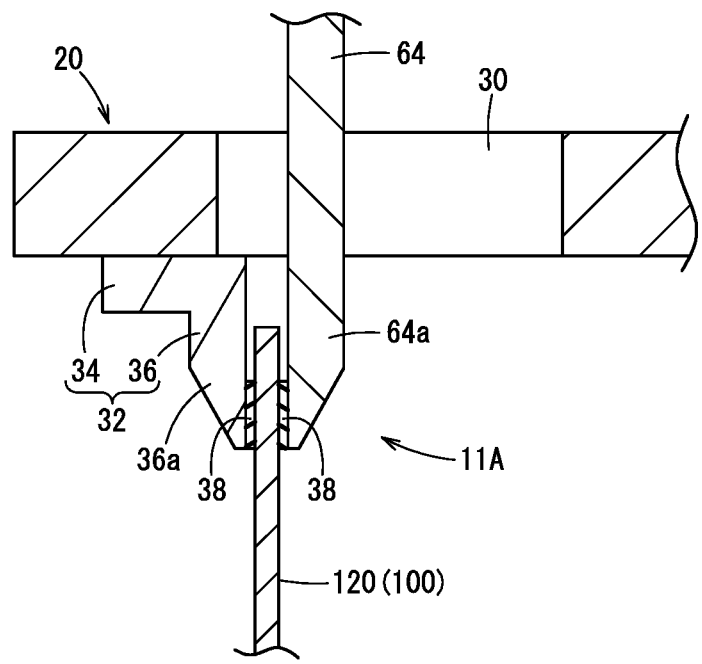
FIG. 7B is a second side cross-sectional view showing gripping by the first gripping mechanism of the workpiece gripping device.

Further, as shown in FIGS. 7A and 7B, in the case of transporting a simple plate-shaped workpiece 120 which does not have the edge portion 114, the workpiece gripping device 10 grips the workpiece 120 by the first gripping mechanism 11A. More specifically, the control unit 18 of the gripping robot 12 rotates the mounted part 15, and causes the first gripping mechanism 11A to face toward the workpiece 120 (see also FIG. 3). Further, prior to gripping the workpiece 120, the control unit 18 drives the second finger unit 60 (the lateral actuator 62), and places the movable gripping body 64 of the workpiece gripping device 10 at a position separated from the fixed gripping body 32.

In addition, when the workpiece gripping device 10 is positioned above the workpiece 120 to be gripped, the gripping robot 12 lowers the workpiece gripping device 10 and inserts the workpiece 120 between the fixed gripping body 32 and the movable gripping body 64. As discussed above, the extending end parts 36a, 64a of the fixed gripping body 32 and the movable gripping body 64 are formed in a wedge shape. Therefore, even if a plurality of workpieces 120 are arranged alongside one another, each of the extending end parts 36a, 64a can be inserted between the workpieces 120 accompanying downward movement thereof, and one of the workpieces 120 can easily be sandwiched between the fixed gripping body 32 and the movable gripping body 64.

When the workpiece gripping device 10 is lowered to a predetermined position, the gripping robot 12 drives the lateral actuator 62 to thereby move the movable gripping body 64 toward the fixed gripping body 32. Consequently, the fixed gripping body 32 and the movable gripping body 64 can sandwich the workpiece 120 to be gripped therebetween. In the gripped state, the fixed gripping body 32 and the movable gripping body 64 can apply a suitable gripping force to the workpiece 120, and further, by the mutual rubber pieces 38, it is possible to prevent the workpiece 120 from being dropped. Accordingly, even with a plate-shaped workpiece 120, the workpiece gripping device 10 can suitably extract the plate-shaped workpiece 120 and transport it to a predetermined position.

Further, as shown in FIG. 3, the workpiece gripping device 10 may be equipped with a bracket 51 (refer to the two-dot dashed line in FIG. 3) on the movable bar 42b of the longitudinal actuator 42, or on the slider 50b of the first guide mechanism 50, or the like. For example, the bracket 51 is formed in an L-shape extending from the slider 50b in the direction of the arrow X1, and is bent in the direction of the arrow Z1. Further, an end part thereof in the direction of the arrow X1 faces toward the gripping position of the workpiece 120 of the first gripping mechanism 11A.

In this case, the bracket 51 can be displaced by the longitudinal actuator 42 in the direction of the arrow Z, and is pressed against the workpiece 120 at a time of gripping of the workpiece 120 that is gripped by the fixed gripping body 32 and the movable gripping body 64. Consequently, by suppressing swinging or the like of the workpiece 120, the bracket 51 can assist the gripping performed by the first gripping mechanism 11A. Further, an end part of the bracket 51 may include a mechanism or the like for clipping the workpiece 120, and can be configured to support the workpiece 120 together with the first gripping mechanism 11A. In essence, in the case that the operation of the actuator of one finger unit from among the pair of finger units 22 is unnecessary in the workpiece gripping device 10, by providing an auxiliary mechanism to a movable portion of the actuator of the one finger unit, it is possible to assist gripping of the workpiece 100 by operation of the other actuator.

Further, the workpiece gripping device 10A according to the modification shown in FIG. 4 is equipped with the first and second hook portions 56, 76 as the first and second retaining structures 48A, 70A, whereby access with respect to the plate-shaped workpiece 120 is enabled from the sides of the workpiece 120 (in the direction of the arrow Y).

Figure 8:
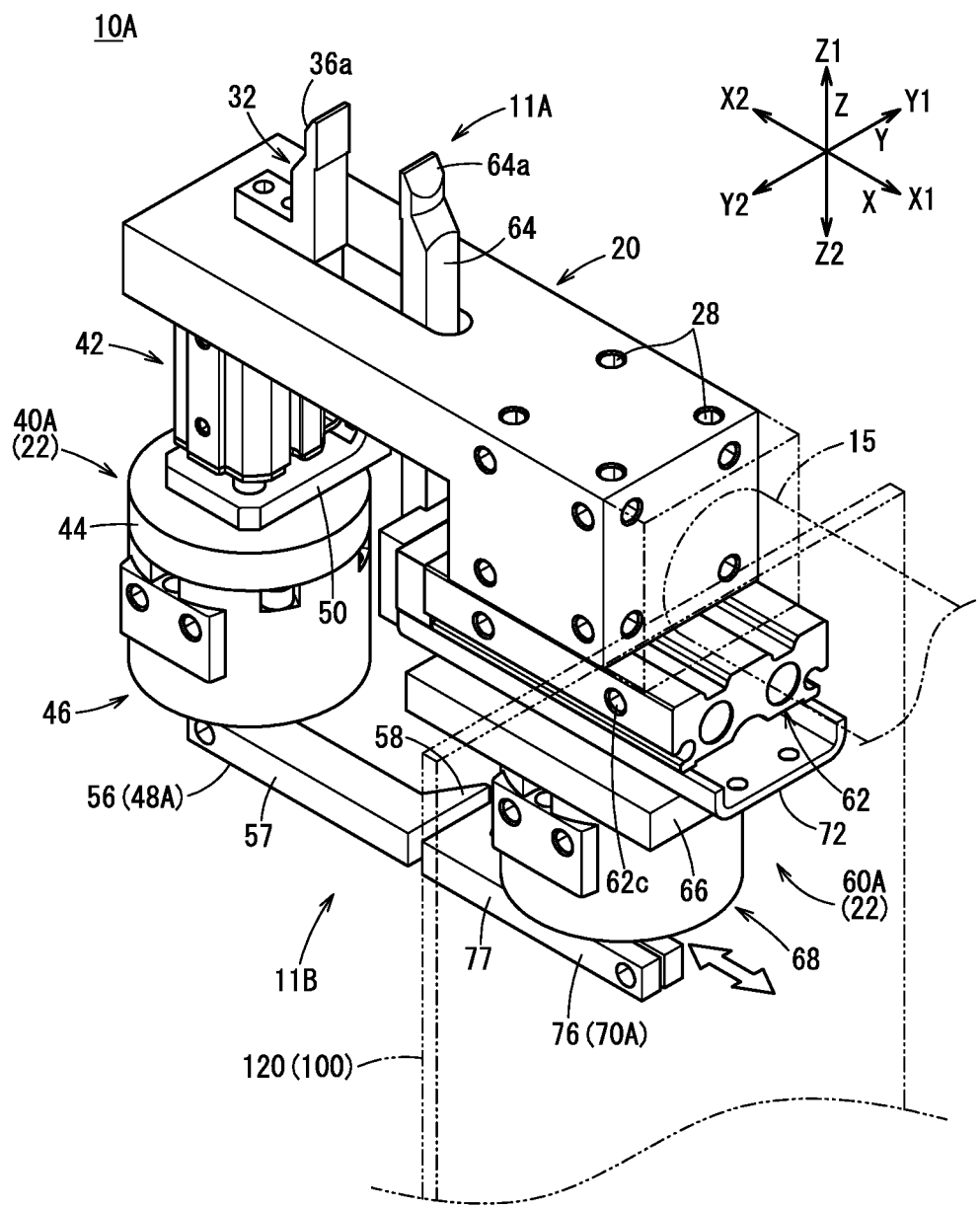
FIG. 8 is an explanatory drawing showing gripping of a workpiece by the workpiece gripping device of FIG. 4.

More specifically, as shown in FIG. 8, the gripping robot 12 places the first and second hook portions 56, 76, which are standing by in the retaining position, against the sides of the workpiece 120. In addition, by rotatably driving the first and second rotary actuators 46, 68, and thereby moving the first and second hook portions 56, 76 respectively to the retaining positions, the workpiece 120 to be gripped is arranged between the first and second hook portions 56, 76. At this time, each of the claw members 58, 78 of the first and second hook portions 56, 76 is sharped in the projecting direction thereof, and therefore, even if a plurality of workpieces 120 are arranged alongside one another, accompanying rotation thereof, the claw members 58, 78 can be inserted between the workpieces 120, and one of the workpieces 120 can easily be sandwiched between the claw members 58, 78.

In addition, in a state in which the first and second hook portions 56, 76 are disposed at the retaining position, the workpiece gripping device 10A drives the lateral actuator 62 and moves the second hook portion 76 in closer proximity to the first hook portion 56. Consequently, it is possible to sandwich the workpiece 120 mutually between the first hook portion 56 and the second hook portion 76.

Figure 9:
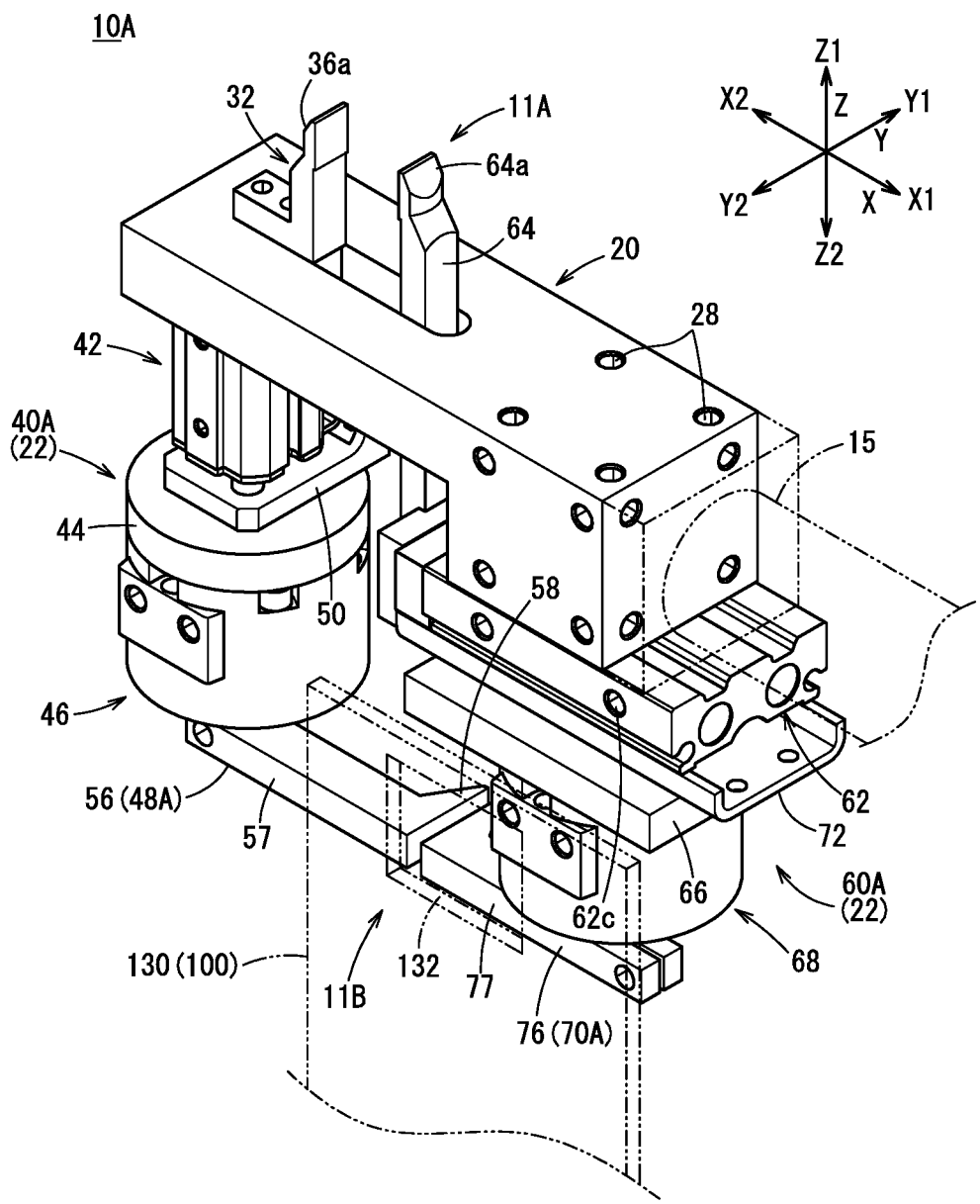
FIG. 9 is an explanatory drawing showing gripping of another workpiece by the workpiece gripping device of FIG. 4.

Further, as shown in FIG. 9, in the workpiece gripping device 10A, by applying the first and second hook portions 56, 76, in the case that a hole 132 or a groove or the like is disposed in the workpiece 130, the workpiece 130 can be gripped using the hole 132 or the groove or the like. For example, accompanying rotation from the standby position to the retaining position, the claw members 58, 78 of the first and second hook portions 56, 76 are inserted into the hole 132 of the workpiece 130. In addition, by driving the lateral actuator 62, the workpiece gripping device 10A adjusts the interval between the claw member 58 of the first hook portion 56 and the claw member 78 of the second hook portion 76. Further, at this time, the longitudinal actuator 42 may be driven so that the heights of the first and second hook portions 56, 76 are made different from each other, and the claw members 58, 78 may be overlapped and inserted into the hole 132.

Consequently, the workpiece gripping device 10A can hook or grab onto an edge portion of the hole 132 of the workpiece 130, and thereby suitably grip the workpiece 100. Moreover, it is a matter of course that the claw members 58, 78 may be designed with appropriate shapes, in a manner so as to easily become hooked or caught on the hole 132 or the groove or the like of the workpiece 130.

In the foregoing manner, with the first retaining structure 48 of the first finger unit 40 and the second retaining structure 70 of the second finger unit 60, the workpiece gripping device 10, 10A according to the present embodiment is capable of suitably gripping workpieces 100 of different shapes. More specifically, the first retaining structure 48, which reciprocates (moves back and forth) in the direction of the arrow Z and rotates on a plane perpendicular to the direction of the arrow Z, and the second retaining structure 70, which reciprocates in the direction of the arrow X and rotates on a plane perpendicular to the direction of the arrow Z, are capable, according to the shape of the workpiece 100, of sandwiching the workpiece 100 along the direction of the arrow Z, or sandwiching the workpiece 100 along the direction of the arrow X. Consequently, the workpiece gripping device 10 is capable of adopting various gripping modes, and thereby exhibits high versatility enabling various types of workpieces to be conveyed.

Further, the relative distance between the first retaining structure 48 and the base body 20 is changed by the first finger unit 40, whereas the relative distance between the second retaining structure 70 and the first finger unit 40 is changed by the second finger unit 60. Therefore, both sandwiching and releasing of sandwiching of the workpieces 100 by the first and second retaining structures 48, 70 can easily be performed. Further, by moving the movable gripping body 64 along the direction of the arrow X, the workpiece gripping device 10 is capable of gripping the workpiece 100 between the fixed gripping body 32 and the movable gripping body 64. In addition, by changing the orientation of the base body 20, the fixed gripping body 32 and the movable gripping body 64, which are disposed on an opposite side of the base body 20 from the first and second finger units 40, 60, can easily be used to grip the workpiece 100 instead of the first and second finger units 40, 60.

In this instance, with a configuration in which the workpiece gripping device 10 rotates the first and second retaining structures 48, 70 in mutually opposite directions, the range of movement of the first and second retaining structures 48, 70 from the standby positions to the retaining positions can be reduced. Thus, even in the case that the available space is small, it is still possible to grip the workpieces 100 satisfactorily. In addition, by the first retaining structure 48 being in the form of the scoop member 52 having the tapered portion 54, it is possible for the workpiece gripping device 10 to enable the scoop member 52 to easily enter onto the lower side of the workpiece 100 along the tapered portion 54.

Alternatively, by the first and second retaining structures 48A, 70A having the claw members 58, 78, the workpiece gripping device 10A can cause the first and second retaining structures 48A, 70A to access the workpiece 100 from the sides of the workpiece 100, and can sandwich a single workpiece 100 by mutual operation of the claw members 58, 78.

In particular, the workpiece gripping device 10 according to the present embodiment is constituted by the longitudinal actuator 42, the first rotary actuator 46, the lateral actuator 62, and the second rotary actuator 68. In accordance with these features, the first retaining structure 48 and the second retaining structure 70 can be operated independently and in cooperation with each other.

The present invention is not limited to the embodiments described above, and various modifications are possible in accordance with the scope of the invention.

What is claimed is:

1. A workpiece gripping device including a base body and a gripping mechanism disposed on the base body and configured to grip a workpiece;

wherein the gripping mechanism comprises:
a first finger unit having a first retaining structure configured to reciprocate in a first axial direction relative to the base body and rotate on a plane perpendicular to the first axial direction; and
a second finger unit having a second retaining structure configured to reciprocate in a second axial direction perpendicular to the first axial direction and rotate on a plane perpendicular to the first axial direction, wherein:
the first axial direction is a direction in which the first retaining structure is made to approach toward or separate away from the base body;
the second axial direction is a direction in which the second retaining structure is made to approach toward or separate away from the first finger unit;
the base body includes a fixed gripping body that projects in a direction perpendicular to the second axial direction; and
the second finger unit includes a movable gripping body configured to, by moving along the second axial direction, grip the workpiece between the movable gripping body and the fixed gripping body.

2. The workpiece gripping device according to claim 1, wherein:
the fixed gripping body projects from the base body in a direction opposite to a direction in which the first finger unit projects; and
the movable gripping body penetrates from the second finger unit through an elongate hole disposed in the base body, and projects in a direction opposite to a direction in which the second finger unit projects.

3. The workpiece gripping device according to claim 1, wherein, as viewed in plan, the first and second retaining structures are arranged in a manner so that directions of rotation from a standby position of waiting prior to retaining the workpiece toward a retaining position of retaining the workpiece are mutually opposite to each other.

4. The workpiece gripping device according to claim 3, wherein at least one of the first and second retaining structures has a tapered portion on a side in a direction from the standby position toward the retaining position.

5. The workpiece gripping device according to claim 3, wherein each of the first and second retaining structures has a claw member projecting from a side in a direction from the standby position toward the retaining position.

6. The workpiece gripping device according to claim 1, wherein:
the first finger unit includes a longitudinal actuator connected to the base body and configured to move the first retaining structure along the first axial direction, and a first rotary actuator connected to the longitudinal actuator and configured to rotate the first retaining structure; and
the second finger unit includes a lateral actuator connected to the base body and configured to move the second retaining structure along the second axial direction, and a second rotary actuator connected to the lateral actuator and configured to rotate the second retaining structure.

* * * * *